United States Patent [19]

Gilg et al.

[11] Patent Number: 5,288,777

[45] Date of Patent: Feb. 22, 1994

[54] PROCESS FOR THE PREPARATION OF STABILIZED STYRENE COPOLYMERS CONTAINING ELASTOMER PARTICLES

[75] Inventors: Bernard Gilg, St. Louis-La-Chaussée, France; Gerhard Rytz, Schwarzenburg; Werner Stauffer, Fribourg, both of Switzerland; Margot Clauss, Riedisheim, France

[73] Assignee: Ciba-Geigy Corporation, Ardsley, N.Y.

[21] Appl. No.: 973,478

[22] Filed: Nov. 9, 1992

Related U.S. Application Data

[62] Division of Ser. No. 769,916, Sep. 30, 1991, Pat. No. 5,194,465.

[30] Foreign Application Priority Data

Oct. 4, 1990 [CH] Switzerland .................. 3200/90

[51] Int. Cl.$^5$ .................. C08K 5/3432; C08K 5/3415; C08G 63/91; C08L 39/04
[52] U.S. Cl. .................. 524/99; 524/87; 525/73; 525/203; 525/279
[58] Field of Search .................. 524/87, 99, 94; 525/203, 279, 73

[56] References Cited

U.S. PATENT DOCUMENTS

| | | | |
|---|---|---|---|
| 3,859,383 | 1/1975 | Tanno et al. | 525/73 |
| 4,110,304 | 8/1978 | Gilg et al. | 524/102 |
| 4,123,418 | 10/1978 | Gilg et al. | 524/102 |
| 4,743,657 | 5/1988 | Rekers et al. | 525/279 |
| 4,956,410 | 9/1990 | Scott et al. | 525/73 |
| 4,957,953 | 9/1990 | Kikkawa et al. | 524/99 |
| 4,983,737 | 1/1991 | Ravichandran et al. | 546/184 |
| 5,004,770 | 4/1991 | Cortolano et al. | 524/99 |
| 5,047,489 | 9/1991 | Ravichandran et al. | 526/263 |
| 5,077,340 | 12/1991 | Ravichandran et al. | 525/203 |

FOREIGN PATENT DOCUMENTS

| | | |
|---|---|---|
| 164048 | 12/1985 | European Pat. Off. . |
| 0180992 | 10/1987 | European Pat. Off. . |
| 0285293 | 10/1988 | European Pat. Off. . |
| 2202226 | 9/1988 | United Kingdom . |

*Primary Examiner*—Paul R. Michl
*Assistant Examiner*—Tae H. Yoon
*Attorney, Agent, or Firm*—Luther A. R. Hall

[57] ABSTRACT

ABS copolymers and similar styrene or α-methylstyrene copolymers which contain an elastomer phase are stabilized against light-induced degradation by a) incorporation of a copolymerizable sterically hindered amine in, and b) addition of a non-copolymerizable sterically hindered amine to, the copolymer. Preferred sterically hindered amines are polyalkylpiperidines.

3 Claims, No Drawings

PROCESS FOR THE PREPARATION OF STABILIZED STYRENE COPOLYMERS CONTAINING ELASTOMER PARTICLES

This is a divisional of application Ser. No. 07/769,916, filed on Sep. 30, 1991, now U.S. Pat. No. 5,194,465, issued on Mar. 16, 1993.

The present invention relates to light-stabilised copolymers of styrene or α-methylstyrene and at least one comonomer, which copolymers contain crosslinked elastomer particles.

Styrene copolymers which contain elastomer particles are thermoplastics which exhibit high impact strength. They are preferably graft copolymers, consisting of a thermoplastic styrene copolymer matrix which contains crosslinked elastomer particles as disperse phase, the copolymer grafted onto the elastomer particles acting as phase promoter. These styrene copolymers are prepared by subjecting slightly crosslinked elastomer particles to graft polymerisation with styrene and one or more comonomers. The slightly crosslinked elastomer particles can be prepared by mass phase inversion or by emulsion polymerisation. Examples of suitable elastomers are polybutadiene, butadiene/acrylonitrile or butadiene/styrene copolymers, ethylene/propylene/diene terpolymers and acrylate elastomers, for example polybutyl acrylate and its copolymers.

Graft copolymers of styrene/acrylonitrile on polybutadiene are called ABS polymers, and graft copolymers of styrene/methyl methacrylate on polybutadiene are called MBS polymers. In addition to these two most important types, other styrene copolymers having elastomer phases have also been disclosed, as well as their polymer blends with styrene copolymers or other thermoplastics. In this connection, reference is made to Encyclopedia Polymer Sci. Engng., J. Wiley 1985, Vol. 1, pages 388–426; Ullmanns Encyclop. d. techn. Chemie (Ullmans Encyclopedia of Industrial Chemistry), Verlag Chemie 1980, Volume 19, pages 277–295.

Plastics of the ABS or MBS type are engineering plastics which are used in bulk, for example for the production of household appliances, electrical appliances or sports equipment and of automotive parts. For outdoor use, these polymers must be stabilised to light and oxygen. It is known that elastomer/styrene graft copolymers age rapidly and thereby become brittle. For example, when ABS polymers were exposed to UV light, disappearance of the double bonds in the polybutadiene phase and at the same time embrittlement of the polymer were observed, resulting ultimately in the loss of impact strength (G. Scott and M. Tahan, Eur. Polym. J. 13 (1977)982).

For stabilisation, antioxidants and light stabilisers are added to these polymers. The light stabilisers used at present are mostly sterically hindered amines, especially in conjunction with UV absorbers. Such combinations are recommended, for example, in DE-A-2 417 535, for all types of styrene copolymers. This constitutes stabilisation by the addition of light stabilisers (physical mixture).

In EP-A-337 431 the proposal has been made to incorporate sterically hindered amines into the elastomer phase by chemical means. This can be done by graft copolymerisation of ethylenically unsaturated sterically hindered amines onto the elastomer particles. Particularly suitable sterically hindered amines are unsaturated derivatives of 2,2,6,6-tetramethylpiperidine, such as 4-acryloyloxy-1,2,2,6,6-pentamethylpiperidine. Grafting is preferably carried out in aqueous emulsion. Subsequently a mixture of styrene or α-methylstyrene and at least one comonomer is grafted onto the modified elastomer particles, whereby the light stabiliser is bonded permanently to the elastomer phase of the copolymer. This is important because the elastomer phase is sensitive to photooxidative degradation.

It is also disclosed in EP-A-337 431 that other known stabilisers can be added to the copolymers stabilised in this manner, typically antioxidants, UV absorbers, metal deactivators or phosphites. No mention is made in this publication of the physical addition of a further sterically hindered amine, as it was not be expected that a second sterically hindered amine would have an additional effect.

Surprisingly, however, it has been found that the intrinsically good stabilisation imparted by the chemical incorporation of a sterically hindered amine into the elastomer phase can be substantially enhanced by adding to the final copolymer a second sterically hindered amine which is not unsaturated and therefore not chemically incorporated.

Accordingly, the invention relates to a light-stabilised copolymer of styrene or α-methylstyrene and at least one comonomer, which copolymer contains crosslinked elastomer particles which are modified by copolymerisation with an unsaturated derivative of a sterically hindered amine, and which copolymer additionally contains a sterically hindered amine which is not unsaturated.

These copolymers are preferably graft copolymers of styrene and at least one comonomer on the modified crosslinked elastomer.

The comonomer may be any polymerisable unsaturated compound, for example an acrylic acid, methacrylic acid or maleic acid derivative or a styrene derivative. The comonomer is preferably acrylonitrile or methyl methacrylate. It is also possible to use two comonomers, for example mixtures of arylonitrile and methyl methacrylate or mixtures of acrylonitrile or methyl methacrylate with small amounts of vinyl acetate, butyl acrylate or maleates.

The copolymers are preferably copolymers of styrene and acrylonitrile or styrene and methyl methacrylate.

The elastomers are preferably copolymers of styrene are acrylonitrile or styrene and methyl methacrylate.

The elastomer may be any elastomer which is suitable for graft copolymerisations. Typical examples of such elastomers are polybutadiene, butadiene/acrylonitrile copolymers, butadiene/styrene copolymers, ethylene/propylene/diene terpolymers or polybutyl acrylate and its copolymers. The preferred elastomer is polybutadiene. The preparation of these elastomer particles is carried out by known processes, for example by mass polymerisation or suspension polymerisation, but preferably by emulsion polymerisation. The elastomer particles are slightly crosslinked and normally have a mean diameter of from 0.1 to 05 μm, preferably from 0.5 to 20 μm.

The elastomer is modified with the sterically hindered amine by copolymerisation. The copolymerisation can be carried out during the preparation of the elastomer or as graft copolymerisation onto the crosslinked elastomer. Grafting with the sterically hindered amine can be effected simultaneously with grafting with the styrene/comonomer mixture. The process is preferably carried out in two steps by first grafting the unsaturated derivative of the sterically hindered amine and then the styrene/comonomer mixture. The graft polymerisation is preferably carried out in emulsion.

A copolymerisable unsaturated derivative of 2,2,6,6-tetramethylpiperidine is preferably used as the unsaturated derivative of a sterically hindered amine. The unsaturated group may be present in a substituent in the 4-position and/or 1-position of the piperidine ring.

Unsaturated groups include preferably acryloyl and methacryloyl groups, as well as maleic acid groups, vinyl ether groups and allyl ether groups, allylamino groups or crotonyl groups.

The copolymerisation with the elastomer is preferably carried out using a compound of formula I

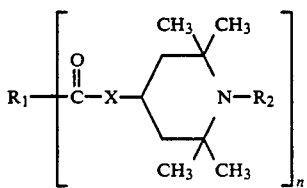

wherein
n is 1 or 2 and X is —O— or —N($R_3$)—,
$R_1$ if n=1, is $C_1$-$C_{18}$alkyl, $C_2$-$C_{20}$alkenyl, $C_5$-$C_8$cycloalkyl, $C_7$-$C_9$phenylalkyl, phenyl, phenyl which is substituted by halogen, $C_1$-$C_4$alkyl or $C_1$-$C_4$alkoxy, or is a $R_4$OOC—CH=CH— group and, if n=2, is $C_2$-$C_{10}$alkylene, vinylene, $C_6$-$C_{12}$arylene or cyclohexylene,
$R_2$ is hydrogen, O, $C_1$-$C_{12}$alkyl, $C_3$-$C_5$alkenyl, $C_7$-$C_9$phenylalkyl, $C_1$-$C_{18}$alkoxy, $C_5$-$C_8$cycloalkoxy, $C_7$-$C_9$phenylalkoxy, $C_2$-$C_{10}$alkanoyl, $C_3$-$C_6$alkenoyl or a group of formula Ia

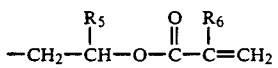

$R_3$ is hydrogen, $C_1$-$C_{12}$alkyl or $C_5$-$C_8$cycloalkyl,
$R_4$ is hydrogen or $C_1$-$C_{12}$alkyl,
$R_5$ is hydrogen, $CH_3$ or CN, and
$R_6$ is hydrogen, $C_1$-$C_{12}$alkyl or phenyl,
with the proviso that at least one of the substituents $R_1$ and $R_2$ contains an ethylenic double bond.

It is also preferred to use the compounds of formula II

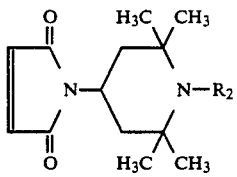

wherein $R_2$ is hydrogen, $C_1$-$C_{12}$alkyl, $C_3$-$C_5$alkenyl, $C_7$-$C_9$phenylalkyl, $C_1$-$C_{18}$alkoxy, $C_5$-$C_8$cycloalkoxy, $C_7$-$C_9$phenylalkoxy or $C_2$-$C_{10}$alkanoyl.

Preferred compounds of formula I are
a) those wherein n is 1, X is —O—, $R_1$ is $C_2$-$C_5$alkenyl and $R_2$ is hydrogen, $C_1$-$C_4$alkyl, allyl, benzyl or acetyl, b) those wherein n is 1 or 2, X is —O—, $R_1$, if n=1, is $C_1$-$C_{18}$alkyl, cyclohexyl or phenyl and, if n=2, is $C_2$-$C_8$alkylene and $R_2$ is $C_3$-$C_6$alkenoyl, c) those wherein n is 1, X is —O—, $R_1$ is $C_2$-$C_5$alkenyl and $R_2$ is a group of formula Ia, wherein $R_5$ and $R_6$ are hydrogen or $CH_3$.

In these formulae, $R_1$, $R_2$, $R_3$, $R_4$ and $R_6$ as alkyl may be unbranched or branched and are typically methyl, ethyl, n-propyl, isopropyl, n-butyl, sec-butyl, tert-butyl, isopentyl, n-hexyl, n-octyl, 2-ethylhexyl, n-decyl, isoundecyl or n-dodecyl. $R_1$ as alkyl may also be tetradecyl, hexadecyl or octadecyl sein.

$R_1$ as $C_2$-$C_{20}$alkenyl may be vinyl, propenyl, isopropenyl, butenyl, pentenyl, undecenyl or oleyl sein, preferably vinyl and 2-propenyl (isopropenyl). $R_2$ as $C_3$-$C_5$alkenyl is preferably allyl.

$R_1$ and $R_3$ as $C_5$-$C_8$cycloalkyl may be cyclopentyl, cyclohexyl or cyclooctyl. Cyclohexyl is preferred.

$R_1$ and $R_2$ as $C_7$-$C_9$phenylalkyl may be benzyl, phenylethyl or phenylpropyl. Benzyl is preferred.

$R_2$ as $C_1$-$C_{18}$alkoxy may preferably be $C_6$-$C_{10}$alkoxy. $R_2$ as $C_5$-$C_8$cycloalkoxy may preferably be cyclohexyloxy. $R_2$ as $C_7$-$C_9$phenylalkoxy may preferably be benzyloxy or phenylethoxy.

$R_2$ as $C_2$-$C_{10}$alkanoyl may be acetyl, propionyl, butyroyl, isobutyroyl, n-pentanoyl, tert-pentanoyl, hexanoyl, octanoyl or isodecanoyl. Acetyl is preferred. $R_2$ as $C_3$-$C_6$alkenoyl is preferably acryloyl or methacryloyl.

$R_1$ as $C_2$-$C_{10}$alkylene may be dimethylene, trimethylene, tetramethylene, hexamethylene, octamethylene, decamethylene, 2,2-dimethyltrimethylene or 1,3,3-trimethyltetramethylene.

$R_1$ as $C_6$-$C_{12}$arylene may be phenylene, naphthylene or diphenylene, preferably phenylene.

All compounds of formulae I and II contain at least one ethylenic double bond which enables the compound to be copolymerised. The compounds may, however, also contain two double bonds. Such compounds are preferably copolymerised during the preparation of the elastomer.

Illustrative examples of compounds of formula I are:
1,2,2,6,6-pentamethyl-4-piperidinyl acrylate, methacrylate or crotonate,
2,2,6,6-tetramethyl-4-piperidinyl acrylate, methacrylate or crotonate,
1-allyl-2,2,6,6-tetramethyl-4-piperidinyl acrylate, methacrylate or crotonate,
1-benzyl-2,2,6,6-tetramethyl-4-piperidinyl acrylate, methacrylate or crotonate,
1-octyloxy-2,2,6,6-tetramethyl-4-piperidinyl acrylate, methacrylate or crotonate,
N-(2,2,6,6-tetramethyl-4-piperidinyl)acrylamide,
N-methyl-N-(1,2,2,6,6-pentamethyl-4-piperidinyl)methacrylamide N-butyl-N-(1,2,2,6,6-pentamethyl-4-piperidinyl)acrylamide,
monoethyl mono(1,2,2,6,6-pentamethyl-4-piperidinyl)maleinate bis(2,2,6,6-tetramethyl-4-piperidinyl)fumarate,
monohexylmaleate-N-(2,2,6,6-tetramethyl-4-piperidinyl)-N-butylamide,
N,N'-bis(1,2,2,6,6-pentamethyl-4-piperidinyl)-N,N'-dibutylmaleamide,
1-acryloyl-2,2,6,6-tetramethyl-4-acetoxypiperidine,
1-methacryloyl-2,2,6,6-tetramethyl-4-butyroyloxypiperidine,
1-crotonyl-2,2,6,6-tetramethyl-4-benzoyloxypiperidine,
1-acryloyl-2,2,6,6-tetramethyl-4-acryloyloxypiperidine, 1-methacryloyl-2,2,6,6-tetramethyl-4-methacryloyloxypiperidine,
1-acryloyl-2,2,6,6-tetramethyl-4-(4-chlorobenzoyloxy)piperidine,
bis(1-acryloyl-2,2,6,6-tetramethyl-4-piperidinyl) sebacate,
bis(1-methacryloyl-2,2,6,6-tetramethyl-4-piperidinyl) adipate,
bis(1-acryloyl-2,2,6,6-tetramethyl-4-piperidinyl) succinate,
bis(1-crotonoyl-2,2,6,6-tetramethyl-4-piperidinyl) phthalate,
N-(1-acryloyl-2,2,6,6-tetramethyl-4-piperidinyl) acetamide,
N-(1-acryloyl-2,2,6,6-tetramethyl-4-piperidinyl)-N-butylbenzamide,
N,N'-bis(1-methacryloyl-2,2,6,6-tetramethyl-4-piperidinyl)-N,N'-dicyclohexylisophthalamide,
1-(2-acryloyloxyethyl)-4-acryloyloxy-2,2,6,6-tetramethylpiperidine,
1-(2-methacryloyloxyethyl)-4-methacryloyloxy-2,2,6,6-tetramethylpiperidine,
1-(2-acryloyloxypropyl)-4-acryloyloxy-2,2,6,6-tetramethylpiperidine.

Illustrative examples of compounds of formula II are:
N-(2,2,6,6-tetramethyl-4-piperidinyl) maleimide,
N-(1,2,2,6,6-pentamethyl-4-piperidinyl) maleimide,
N-(1-benzyl-2,2,6,6-tetramethyl-4-piperidinyl) maleimide,
N-(1-acetyl-2,2,6,6-tetramethyl-4-piperidinyl) maleimide.

However, the eligible unsaturated derivatives of sterically hindered amines are by no means restricted to compounds of formulae I and II. In principle, it is possible to use any unsaturated derivative of a sterically hindered amine, provided it is capable of undergoing copolymerization with the elastomer component.

The unsaturated sterically hindered amine can be copolymerised alone or together with other unsaturated compounds. Such copolymers are typically alkyl acrylates, alkyl methacrylates, acrylamides and methacrylamides, acrylonitrile or methacrylonitrile, preferably alkyl(meth)acrylates.

The mixture of styrene or α-methylstyrene and the comonomer can be grafted together with the unsaturated derivative of a sterically hindered amine onto the elastomer particles. The graft copolymerisation is preferably carried out in two steps. In the first step, the unsaturated sterically hindered amine is grafted, alone or together with other unsaturated compounds, onto the elastomer. In a second step, the mixture of styrene or α-methylstyrene and the comonomer is then grafted onto the elastomer.

Alternatively, the elastomer particles grafted with the unsaturated sterically hindered amine can be mixed with a separately prepared styrene or α-methylstyrene copolymer in a second step. However, it is preferred to graft the styrene phase onto the modified elastomer.

The copolymerisation or graft copolymerisation is carried out by conventional methods. It is preferably carried out in emulsion. The emulsifier used is preferably an anionic surfactant, for example an alkali metal sulfonate or alkali metal resinate. The particle size of the polymer can be controlled by adjusting the amount and metering the surfactant. Water-soluble free radical initiators, for example potassium persulfate, are preferably used as polymerisation initiators for the preparation of the elastomer phase. For the polymerisation of the styrene phase, it is preferred to use redox initiators, for example the system iron(II)salt/organic peroxide. Both stages of the polymerisation are preferably carried out at below 100° C., in particular at 40°-70° C. The copolymer may be isolated by coagulation or by spray drying. Coagulation of the emulsion can be achieved by adding water-soluble salts, by increasing the temperature, by reducing the pH or by freezing.

The addition of the sterically hindered amine which is not unsaturated can be made before or after the coagulation. The addition is preferably made to the isolated and dried copolymer. All methods commonly used for plastics additives are suitable for this addition, such as blending in powder form, or incorporation on a mixer roll or in an extruder.

The amount of sterically hindered amine incorporated by copolymerisation is preferably 0.1 to 10% by weight of the copolymer, and the amount of the sterically hindered amine which is not unsaturated is 0.05 to 5% by weight of the copolymer.

The sterically hindered amine which is not unsaturated is preferably a polyalkylpiperidine which contains at least one group of formula III

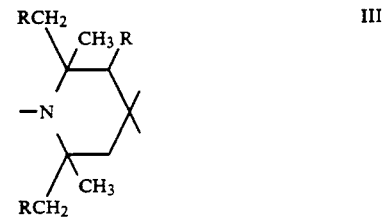

wherein R is hydrogen or methyl. Preferably R is hydrogen. Such compounds are derivatives of 2,2,6,6-tetramethylpiperidine. These compounds can be low molecular (MW<700) or high molecular (oligomer, polymer). They preferably carry in 4-position one or two polar substituents or a polar spiro ring system.

Particularly important light stabilisers are the following classes of polyalkylpiperidines.

a) Compounds of formula IV

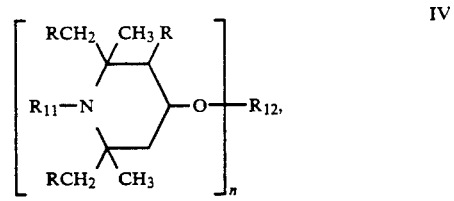

wherein n is an integer from 1 to 4, preferably 1 or 2, R is hydrogen or methyl, $R_{11}$ is hydrogen, oxyl, hydroxyl, $C_1-C_{12}$alkyl, $C_7-C_{12}$aralkyl, $C_1-C_{18}$alkoxy, $C_5-C_8$cycloalkoxy, $C_7-C_9$phenylalkoxy, $C_1-C_8$alkanoyl, $C_1-C_{18}$alkanoyloxy, benzoyloxy, glycidyl or a —$CH_2CH(OH)$—Z group, wherein Z is hydrogen, methyl or phenyl, the preferred meanings of $R_{11}$ being H, $C_1-C_4$alkyl, benzyl, acetyl, $C_1-C_{12}$alkoxy, $C_7-C_9$phenylalkoxy or cyclohexyloxy and $R_{12}$, if n is 1, is hydrogen, $C_1-C_{18}$alkyl which may be interrupted by one or more oxygen atoms, cyanoethyl, benzyl, glycidyl, a divalent radical of a saturated aliphatic, cycloaliphatic, araliphatic or aromatic carboxylic acid, carbamic acid or phosphorus-containing acid, or a monovalent silyl radical, preferably a radical of a saturated aliphatic carboxylic acid of 2 to 18 carbon atoms, of a saturated cycloaliphatic carboxylic acid of 7 to 15 carbon atoms, or of an aromatic carboxylic acid of 7 to 15 carbon atoms, or of an aromatic carboxylic acid of 7 to 15 carbon atoms, and, if n is 2, is $C_1$–$C_{12}$alkylene, xylylene, a divalent radical of a saturated aliphatic, cycloaliphatic, araliphatic or aromatic dicarboxylic acid, dicarbamic acid or phosphorus-containing acid, or a divalent sylyl radical, preferably the divalent radical of a saturated aliphatic dicarboxylic acid of 2 to 12 carbon atoms, of a saturated cycloaliphatic or aromatic dicarboxylic acid of 8 to 14 carbon atoms, or of a saturated aliphatic, cycloaliphatic or aromatic dicarbamic acid of 8 to 14 carbon atoms, if n is 3, is a trivalent radical of a saturated aliphatic tricarboxylic acid of 6 to 12 carbon atoms or of an aromatic tricarboxylic acid of 9 to 15 carbon atoms, and, if n is 4, is the tetravalent radical of a saturated aliphatic tetracarboxylic acid of 8 to 12 carbon atoms or of an aromatic tetracarboxylic acid of 10 to 16 carbon atoms.

Substituents defined as $C_1$–$C_{12}$alkyl may be methyl, ethyl, n-propyl, n-butyl, sec-butyl, tert-butyl, n-hexyl, n-octyl, 2-ethylhexyl, n-nonyl, n-decyl, n-undecyl or n-dodecyl.

$R_{11}$ or $R_{12}$ as $C_1$–$C_{18}$alkyl may be the groups listed above and, in addition, may be n-tridecyl, n-tetradecyl, n-hexadecyl or n-octadecyl.

$R_{11}$ as $C_7$–$C_{12}$aralkyl is preferably phenethyl and, most preferably, benzyl.

$R_{11}$ as $C_1$–$C_8$alkanoyl is typically formyl, propionyl, butyryl, octanoyl and, preferably, acetyl.

$R_{12}$ as a monovalent radical of a carboxylic acid is typically a radical of acetic acid, caproic acid, stearic acid, acrylic acid, methacrylic acid, benzoic acid, or a $\beta$-(3,5-di-tert.-butyl-4-hydroxyphenyl)propionic acid radical.

$R_{12}$ as a divalent radival of a dicarboxylic acid may be a radical of malonic acid, succinic acid, glutaric acid, adipic acid, suberic acid, sebacic acid, phthalic acid, dibutylmalonic acid, dibenzylmalonic acid or butyl-(3,5-di-tert-butyl-4-hydroxybenzyl)malonic acid.

$R_{12}$ as a trivalent radical of a tricarboxylic acid may be a radical of trimellitic acid, citric acid or nitrilotriacetic acid.

$R_{12}$ as a tetravalent radical of a tetracarboxylic acid may be a tetravalent radical of butane-1,2,3,4-tetracarboxylic acid or of pyromellitic acid.

$R_{12}$ as a divalent radical of a dicarbamic acid may be a radical of hexamethylenedicarbamic acid or a radical of 2,4-toluylenedicarbamic acid.

Compounds of formula IV are preferred wherein R is hydrogen, $R_{11}$ is hydrogen or methyl, n is 2 and $R_{12}$ is the diacyl radical of an aliphatic dicarboxylic acid of 4 to 12 carbon atoms.

The following compounds exemplify polyalkylpiperidine compounds of this class:
1) 4-hydroxy-2,2,6,6-tetramethylpiperidine
2) 1-benzyl-4-hydroxy-2,2,6,6-tetramethylpiperidine
3) 1-(4-tert-butyl-2-butenyl)-4-hydroxy-2,2,6,6-tetramethylpiperidine
4) 4-stearoyloxy-2,2,6,6-tetramethylpiperidine
5) 1-ethyl-4-salicyloyloxy-2,2,6,6-tetramethylpiperidine
6) 1,2,2,6,6-pentamethylpiperidin-4-yl-$\beta$-(3,5-di-tert-butyl-4-hydroxyphenyl)-propionate
7) bis(1-benzyl-2,2,6,6-tetramethylpiperidin-4-yl) maleate
8) bis(2,2,6,6-tetramethylpiperidin-4-yl) succinate
9) bis(2,2,6,6-tetramethylpiperidin-4-yl) glutarate
10) bis(2,2,6,6-tetramethylpiperidin-4-yl) adipate
11) bis(2,2,6,6-tetramethylpiperidin-4-yl) sebacate
12) bis(1,2,2,6,6-pentamethylpiperidin-4-yl) sebacate
13) bis(1,2,3,6-tetramethyl-2,6-diethylpiperidin-4-yl) sebacate
14) tetra(2,2,6,6-tetramethylpiperidin-4-yl)-butane-1,2,3,4-tetracarboxylate
15) tetra(1,2,2,6,6-pentamethylpiperidin-4-yl)-butane-1,2,3,4-tetracarboxylate
16) tris(2,2,6,6-tetramethylpiperidin-4-yl) trimellitate,
17) bis(2,2,6,6-tetramethylpiperidin-4-yl) diethylmalonate
18) bis(1,2,2,6,6-pentamethylpiperidin-4-yl) dibutylmalonate
19) bis(1,2,2,6,6-pentamethylpiperidin-4-yl) butyl-(3,5-di-tert-butyl-4-hydroxybenzyl)malonate
20) bis(1-octyloxy-2,2,6,6-tetramethylpiperidin-4-yl) sebacate
21) bis(1-cyclohexyloxy-2,2,6,6-tetramethylpiperidin-4-yl) sebacate
22) hexane-1',6'-bis(4-carbamoyloxy-1-n-butyl-2,2,6,6-tetramethylpiperidine)
23) toluene-2',4'-bis(4-carbamoyloxy-1-n-propyl-2,2,6,6-tetramethylpiperidine)
24) dimethyl bis(2,2,6,6-tetramethylpiperidin-4-oxy)silane
25) phenyl tris(2,2,6,6-tetramethylpiperidin-4-oxy)silane
26) tris(1-propyl-2,2,6,6-tetramethylpiperidin-4-yl) phosphite
27) tris(1-propyl-2,2,6,6-tetramethylpiperidin-4-yl) phosphate
28) phenyl [bis(1,2,2,6,6-pentamethylpiperidin-4-yl)] phosphonate
29) 4-hydroxy-1,2,2,6,6-pentamethylpiperidine
30) 4-hydroxy-N-hydroxyethyl-2,2,6,6-tetramethylpiperidine
31) 4-hydroxy-N-(2-hydroxypropyl)-2,2,6,6-tetramethylpiperidine
32) 1-glycidyl-4-hydroxy-2,2,6,6-tetramethylpiperidine;

b) compounds of formula V

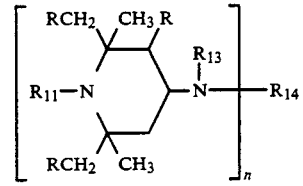

V wherein n is 1 or 2, R and $R_{11}$ are as defined in a), $R_{13}$ is hydrogen, $C_1$–$C_{12}$alkyl, $C_2$–$C_5$hydroxyalkyl, $C_5$–$C_7$cycloalkyl, $C_7$–$C_8$aralkyl, $C_2$–$C_{18}$alkanoyl, benzoyl or a group of formula

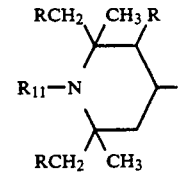

and $R_{14}$, if n is 1, is hydrogen, $C_1$–$C_{18}$alkyl, $C_5$–$C_7$cycloalkyl, $C_1$–$C_4$alkyl which is substituted by a hydroxy, cyano, alkoxycarbonyl or carbamide group, glycidyl, a group of formula —$CH_2$—CH(OH)—Z or —CONH—Z, wherein Z is hydrogen, methyl or phenyl; and, if n is 2, is $C_2$–$C_{12}$alkylene, $C_6$–$C_{12}$arylene, xylylene, a —CH$_2$—CH(OH)—CH$_2$— group or a —CH$_2$—CH(OH)—CH$_2$—O—D—O— group, wherein D is C$_2$-C$_{10}$alkylene, C$_6$-C$_{15}$arylene, C$_6$-C$_{12}$cycloalkylene or, with the proviso that R$_{13}$ is not alkanoyl or benzoyl, R$_{14}$ may also be a divalent radical of a saturated aliphatic, cycloaliphatic or aromatic dicarboxylic acid or dicarbamic acid or also the —CO— group, or R$_{13}$ and R$_{14}$, when taken together, if n is 1, may be the divalent radical of a saturated aliphatic, cycloaliphatic or aromatic 1,2- or 1,3-dicarboxylic acid.

Substituents defined as C$_1$-C$_{12}$alkyl or C$_1$-C$_{18}$alkyl are as previously defined in a) above.

Substituents defined as C$_5$-C$_7$cycloalkyl are preferably cyclohexyl.

R$_{13}$ as C$_7$-C$_8$aralkyl is preferably phenylethyl or, most preferably, benzyl. R$_{13}$ as C$_2$-C$_5$hydroxyalkyl is preferably 2-hydroxyethyl or 2-hydroxypropyl.

R$_{13}$ as C$_2$-C$_{18}$alkanoyl may be propionyl, butyryl, octanoyl, dodecanoyl, hexadecanoyl, octadecanoyl, but is preferably acetyl.

R$_{14}$ as C$_1$-C$_4$alkyl which is substituted by a hydroxy, cyano, alkoxycarbonyl or carbamide group may be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Substituents defined as C$_2$-C$_{12}$alkylene may be ethylene, propylen, 2,2-dimethylpropylene, tetramethylene, hexamethylene, octamethylene, decamethylene or dodecamethylene.

Substituents defined as C$_6$-C$_{15}$arylene may be o-, m- or p-phenylene, 1,4-naphthylene or 4,4'-diphenylene.

D as C$_6$-C$_{12}$cycloalkylene is preferably cyclohexylene.

Preferred compounds of formula V are those wherein n is 1 or 2, R is hydrogen, R$_{11}$ is hydrogen or methyl, R$_{13}$ is hydrogen, C$_1$-C$_{12}$alkyl or a group of formula

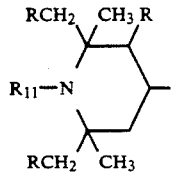

and R$_{14}$, if n=1, is hydrogen or C$_1$-C$_{12}$alkyl and, if n=2, is C$_2$-C$_8$alkylene.

The following compounds are illustrative examples of polyalkylpiperidine compounds of this class:
33) N,N'-bis(2,2,6,6-tetramethylpiperidin-4-yl)hexamethylene-1,6-diamine
34) N,N'-bis(2,2,6,6-tetramethylpiperidin-4-yl)hexamethylene-1,6-diacetamide
35) bis(2,2,6,6-tetramethylpiperidin-4-yl)amine
36) 4-benzoylamino-2,2,6,6-tetramethylpiperidine
37) N,N'-bis(2,2,6,6-tetramethylpiperidin-4-yl)-N,N'-dibutyladipamide
38) N,N'-bis(2,2,6,6-tetramethylpiperidin-4-yl)-N,N'-dicyclohexyl-2-hydroxypropylen-1,3-diamine
39) N,N'-bis(2,2,6,6-tetramethylpiperidin-4-yl)-p-xylylenediamine
40) N,N'-bis(2,2,6,6-tetramethylpiperidin-4-yl)succinamide
41) dodecyl N-(2,2,6,6-tetramethylpiperidin-4-yl)-β-aminopropionate
42) the compound of formula

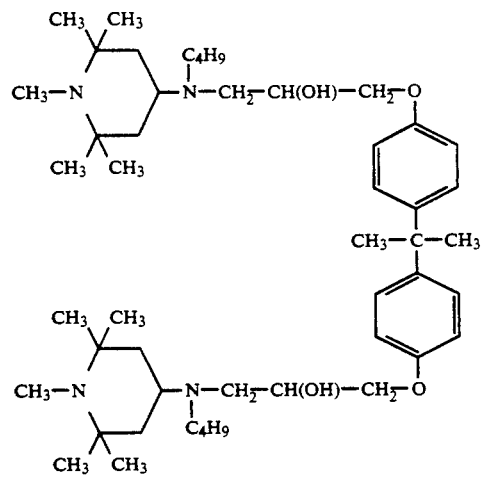

43) 4-(bis-2-hydroxyethylamino)-1,2,2,6,6-pentamethylpiperidine
44) N-(2,2,6,6-tetramethylpiperidin-4-yl)-α-dodecylsuccinimide c) compounds of formula VI

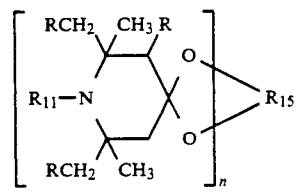

wherein n is 1 or 2, R and R$_{11}$ are as defined in a) and R$_{15}$, if n is 1, is C$_2$-C$_8$alkylene or C$_2$-C$_8$hydroxyalkylene or C$_4$-C$_{22}$acyloxyalkylene, and, if n is 2, is the (—CH$_2$)$_2$C(CH$_2$—)$_2$ group.

R$_{15}$ as C$_2$-C$_8$alkylene or C$_2$-C$_8$hydroxyalkylene may be ethylene, 1-methylethylene, propylene, 2-ethylpropylene or 2-ethyl-2-hydroxymethylpropylene.

R$_{15}$ as C$_4$-C$_{22}$acyloxyalkylene is 2-ethyl-2-acetoxymethylpropylene.

The following compounds are illustrative examples of polyalkylpiperidine compounds of this class:
45) 9-aza-8,8,10,10-tetramethyl-1,5-dioxaspiro[5.5]undecane
46) 9-aza-8,8,10,10-tetramethyl-3-ethyl-1,5-dioxaspiro[5.5]undecane
47) 8-aza-2,7,7,8,9,9-hexamethyl-1,4-dioxaspiro[4.5]decane
48) 9-aza-3-hydroxymethyl-3-ethyl-8,8,9,10,10-pentamethyl-1,5-dioxaspiro[5.5]undecane
49) 9-aza-3-ethyl-3-acetoxymethyl-9-acetyl-8,8,10,10-tetramethyl-1,5-dioxaspiro[5.5]-undecane
50) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine).

d) compounds of formulae VIIA, VIIB and VIIC

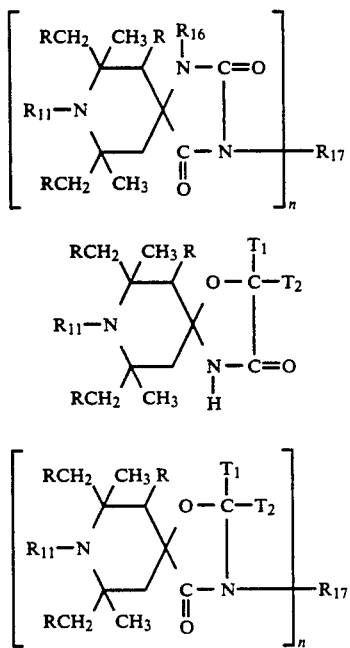

VIIA

VIIB

VIIC wherein n is 1 or 2, R and $R_{11}$ are as defined in a), $R_{16}$ is hydrogen, $C_1$-$C_{12}$alkyl, allyl, benzyl, glycidyl or $C_2$-$C_6$alkoxyalkyl and $R_{17}$, if n is 1, is hydrogen, $C_1$-$C_{12}$ alkyl, $C_7$-$C_9$aralkyl, $C_5$-$C_7$cycloalkyl, $C_2$-$C_4$hydroxyalkyl, $C_2$-$C_6$alkoxyalkyl, $C_6$-$C_{10}$aryl, glycidyl or a group —$(CH_2)_p$—COO—Q or —$(CH_2)_p$—O—CO—Q, wherein p is 1 or 2 and Q is $C_1$-$C_4$alkyl or phenyl, and, if n is 2, is $C_2$-$C_{12}$alkylene, $C_6$-$C_{12}$arylene, a group —$CH_2$—CH(OH)—$CH_2$—O—D—O—$CH_2$—CH(OH)—$CH_2$—, wherein D is $C_2$-$C_{10}$alkylene, $C_6$-$C_{15}$arylene or $C_6$-$C_{12}$cycloalkylene, or a group —$CH_2CH(OZ')CH_2$—(OCH$_2$—CH(OZ')CH$_2$)$_2$—, wherein Z' is hydrogen, $C_1$-$C_{18}$alkyl, benzyl, $C_2$-$C_{12}$alkanoyl or benzoyl, $T_1$ and $T_2$ are each independently of the other $C_1$-$C_{18}$alkyl or $C_6$-$C_{10}$aryl or $C_7$-$C_9$aralkyl which are each unsubstituted or substituted by halogen or $C_1$-$C_4$alkyl, or $T_1$ and $T_2$, together with the linking carbon atom, form a $C_5$-$C_{12}$cycloalkane ring.

Substituents defined as $C_1$-$C_{12}$alkyl may be methyl, ethyl, n-propyl, n-butyl, sec-butyl, tert-butyl, n-hexyl, n-octyl, 2-ethylhexyl, n-nonyl, n-decyl, n-undecyl or n-dodecyl.

Substituents defined as $C_1$-$C_{18}$alkyl may be the groups named above and, in addition, n-tridecyl, n-tetradecyl, n-hexadecyl or n-octadecyl.

Substituents defined as $C_2$-$C_6$alkoxyalkyl may be methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

$R_{17}$, $T_1$ and $T_2$ as $C_7$-$C_9$aralkyl are preferably phenethyl or, most preferably, benzyl. A cycloalkane ring formed by $T_1$ and $T_2$ together with the linking carbon atom may be a cyclopentane, cyclohexane, cyclooctane or cyclododecane ring.

$R_{17}$ as $C_2$-$C_4$hydroxyalkyl may be 2-hydroxyethyl, 2-hydroxypropyl, 2-hydroxybutyl or 4-hydroxybutyl.

$R_{17}$, $T_1$ and $T_2$ as $C_6$-$C_{10}$aryl are preferably phenyl, α- or β-naphthyl, which are each unsubstituted or substituted by halogen or $C_1$-$C_4$alkyl.

$R_{17}$ as $C_2$-$C_{12}$alkylene may be ethylene, propylene, 2,2-dimethylpropylene, tetramethylene, hexamethylene, octamethylene, decamethylene or dodecamethylene.

$R_{17}$ as $C_6$-$C_{12}$arylene may be o-, m- or p-phenylene, 1,4-naphthylene or 4,4'-diphenylene.

Z' as $C_2$-$C_{12}$alkanoyl may be propionyl, butyryl, octanoyl, dodecanoyl, but is preferably acetyl.

D as $C_2$-$C_{10}$alkylene, $C_6$-$C_{15}$arylene or $C_6$-$C_{12}$cycloalkylene is as defined in b).

The following compounds are illustrative of polyalkylpiperidine compounds of this class:

51) 3-benzyl-1,3,8-triaza-7,7,9,9-tetramethylspiro[4.5]decane-2,4-dione
52) 3-n-octyl-1,3,8-triaza-7,7,9,9-tetramethylspiro[4.5]decane-2,4-dione
53) 3-glycidyl-1,3,8-triaza-7,7,8,9,9-pentamethylspiro[4.5]decane-2,4-dione
54) 1,3,7,7,8,9,9-heptamethyl-1,3,8-triazaspiro[4.5]decane-2,4-dione
55) 2-isopropyl-7,7,9,9-tetramethyl-1-oxa-3,8-diaza-4-oxo-spiro[4.5]decane
56) 2,2-dibutyl-7,7,9,9-tetramethyl-1-oxa-spiro-[4.5]decane
57) 2,2,4,4-tetramethyl-7-oxa-3,20-diaza-21-oxo-dispiro[5.1.11.2]heneicosane
58) 2-butyl-7,7,9,9-tetramethyl-1-oxa-4,8-diaza-3-oxo-spiro-[4,5]decane
59) 8-acetyl-3-dodecyl-1,3,8-triaza-7,7,9,9-tetramethyl-spiro[4,5]-decane-2,4-dione
or the compounds of the following formulae:

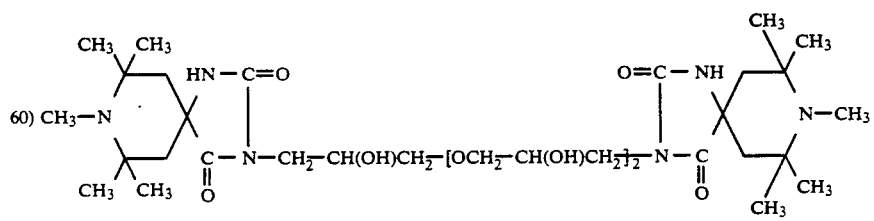

-continued

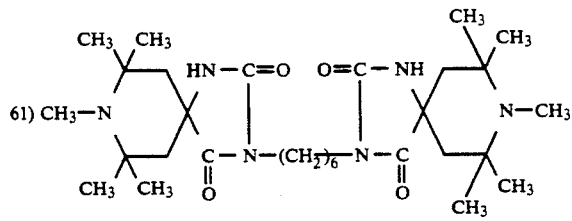

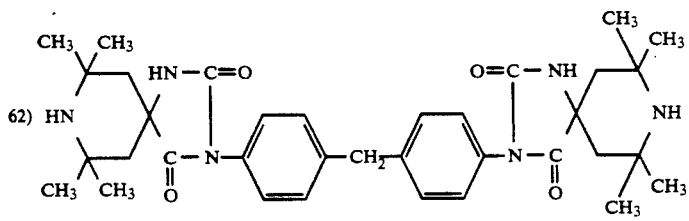

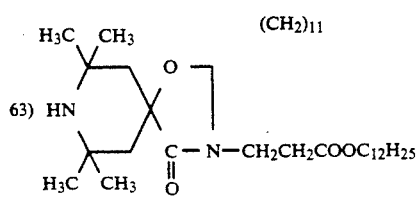

e) compounds of formula VIII

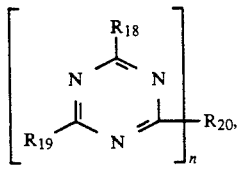 VIII wherein n is 1 or 2 and $R_{18}$ is a group of formula

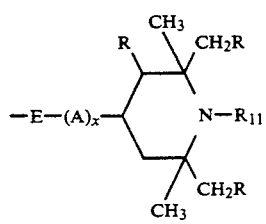

wherein R and $R_{11}$ is as defined in a), E is —O— or —$NR_{21}$—, A is $C_2$-$C_6$alkylene or —(CH$_2$)$_3$—O— and x is 0 or 1, $R_{19}$ has the same meaning as $R_{18}$ or is a group selected from —$NR_{21}R_{22}$, —$OR_{23}$, —$NHCH_2OR_{23}$ and —$N(CH_2OR_{23})_2$, $R_{20}$, if n=1, has the same meaning as $R_{18}$ or $R_{19}$, and, if n=2, is a group —E—B—E—, wherein B is $C_2$-$C_6$alkylene which may be interrupted by —$N(R_{21})$—, $R_{21}$ is $C_1$-$C_{12}$alkyl, cyclohexyl, benzyl or $C_1$-$C_4$hydroxyalkyl or is a group of formula

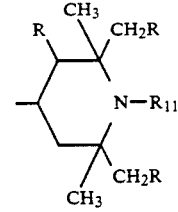

$R_{22}$ is $C_1$-$C_{12}$alkyl, cyclohexyl, benzyl, $C_1$-$C_4$hydroxyalkyl, and $R_{23}$ is hydrogen, $C_1$-$C_{12}$alkyl or phenyl, or $R_{21}$ and $R_{22}$, when taken together, are $C_4$-$C_5$alkylene or $C_4$-$C_5$oxaalkylene, for example

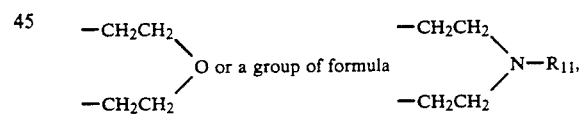

or $R_{21}$ and $R_{22}$ are also each a group of formula

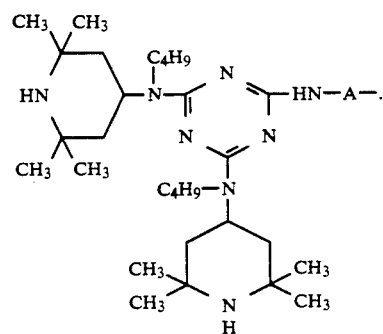

Substituents defined as $C_1$-$C_{12}$alkyl may be methyl, ethyl, n-propyl, n-butyl, sec-butyl, tert-butyl, n-hexyl, n-octyl, 2-ethylhexyl, n-nonyl, n-decyl, n-undecyl or n-dodecyl.

Substituents defined as $C_1$-$C_4$-hydroxyalkyl may be 2-hydroxyethyl, 2-hydroxypropyl, 3-hydroxypropyl, 2-hydroxybutyl or 4-hydroxybutyl.

A as $C_2$-$C_6$alkylene may be ethylene, propylene, 2,2-dimethylpropylene, tetramethylene or hexamethylene.

$R_{21}$ and $R_{22}$ together as $C_4$-$C_5$alkylene or oxaalkylene may be tetramethylene, pentamethylene or 3-oxapentamethylene.

The following compounds are illustrative of polyalkylpiperidine compounds of this class:

64) 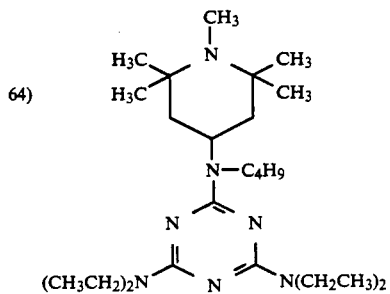

65) 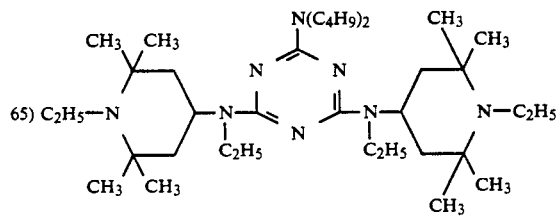

66) 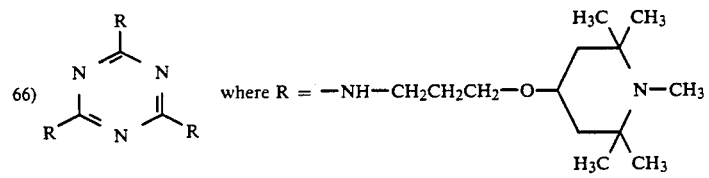

67) 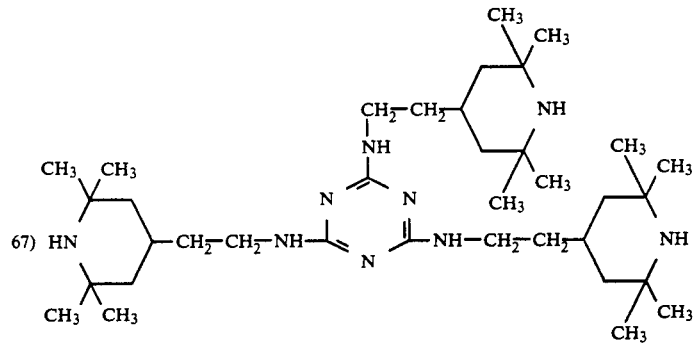

68) 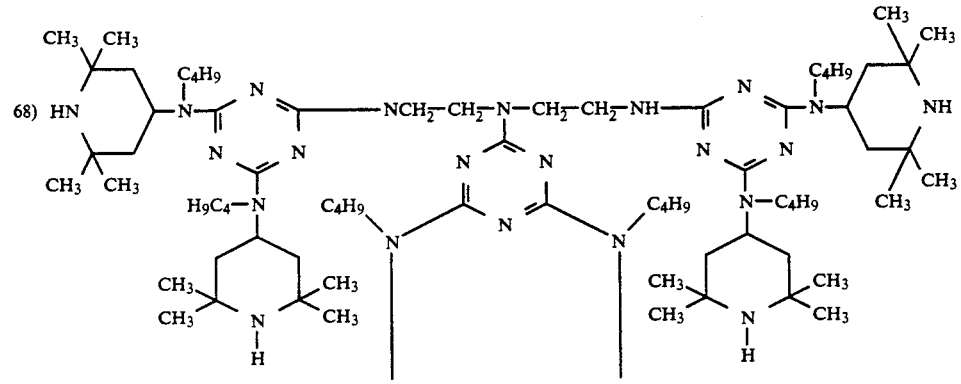

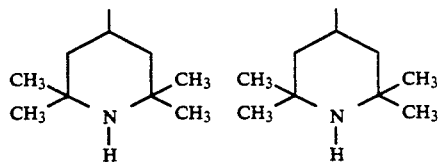
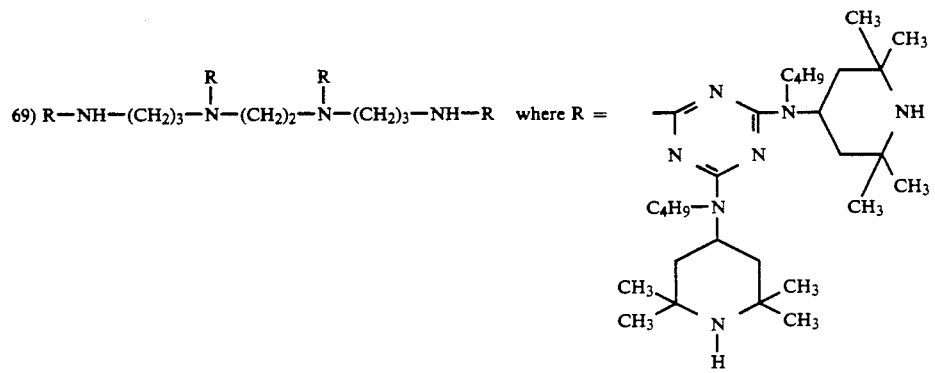
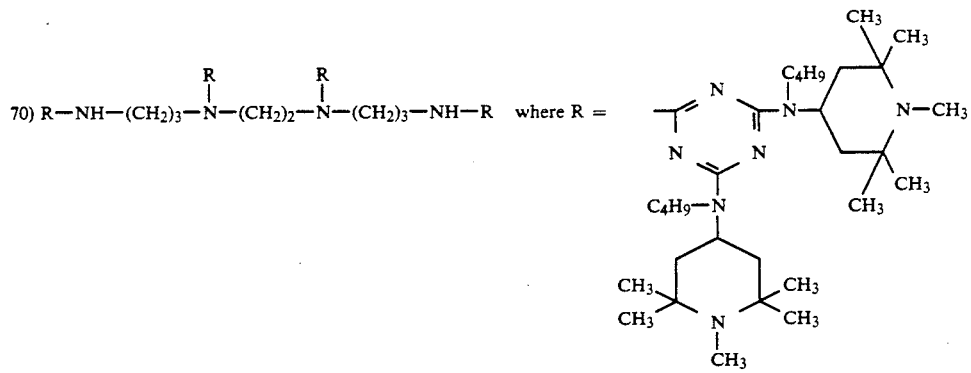
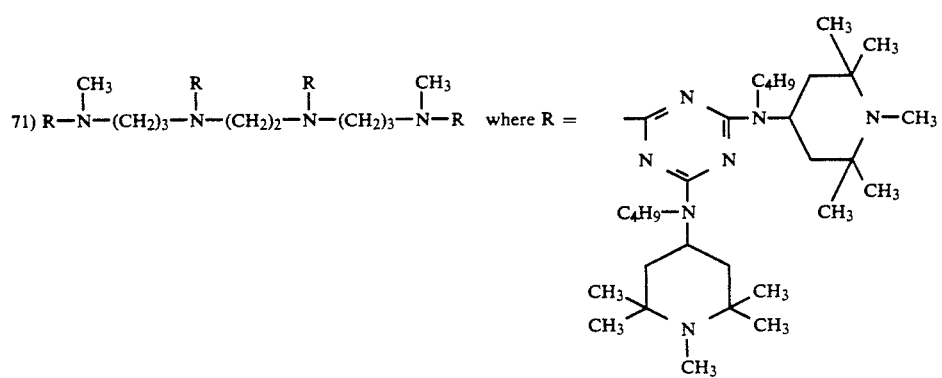

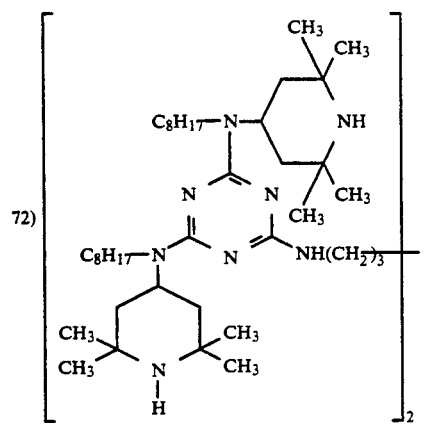

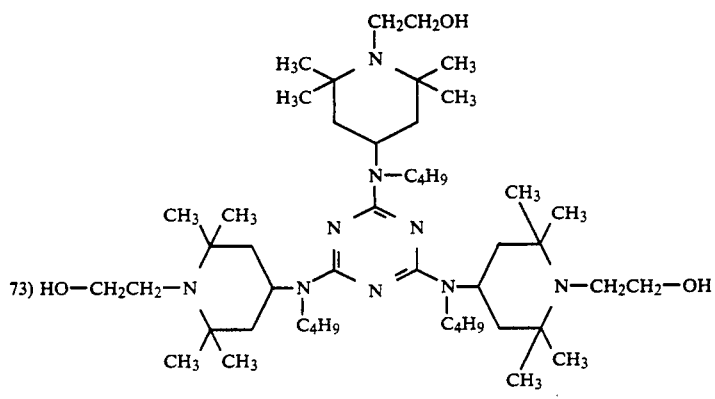

f) Oligomeric or polymeric compounds whose structural repeating unit contains a 2,2,6,6-tetraalkylpiperidine radical of formula III, preferably polyesters, polyethers, polyamides, polyamines, polyurethanes, polyureas, polyaminotriazines, poly(meth)acrylates, poly(meth)acrylamides and the copolymers thereof which contain such radicals.

Exemplary of 2,2,6,6-polyalkylpiperidine light stabilisers of this class are the compounds of the following formulae, wherein m is an integer from 2 to c. 200:

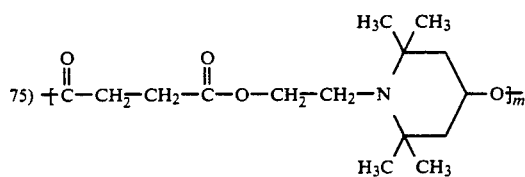

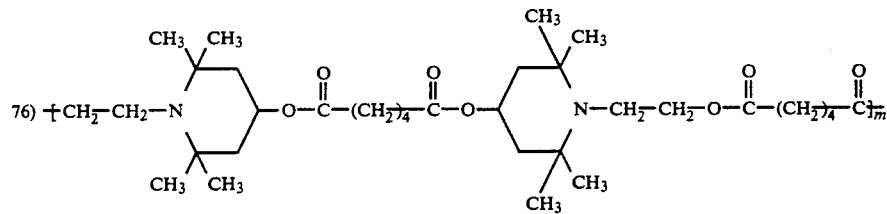

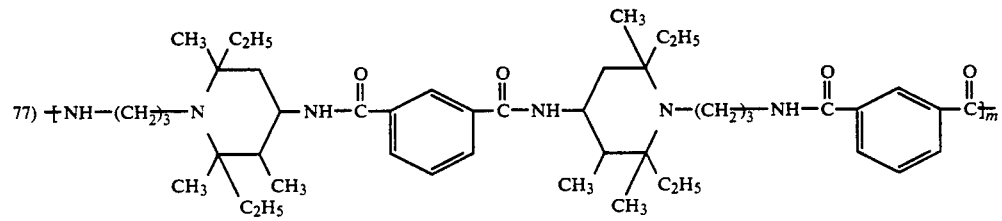

-continued
78) 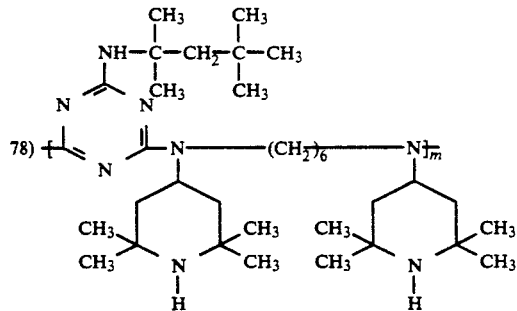
79) 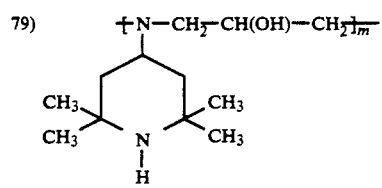
80) 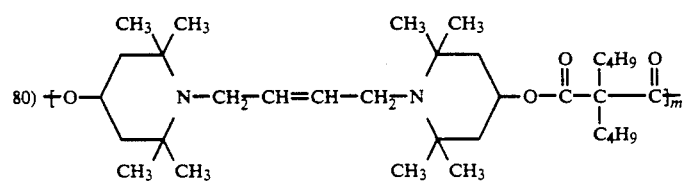
81) 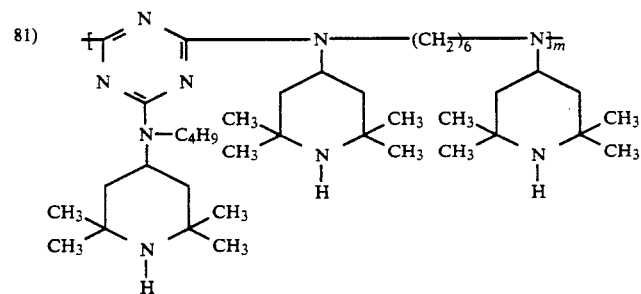
82) 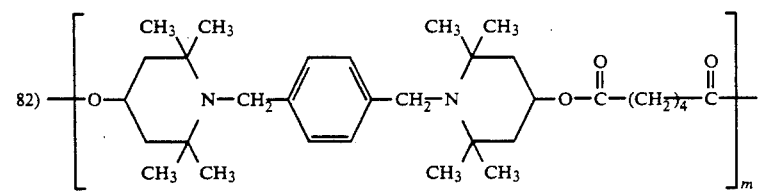
83) 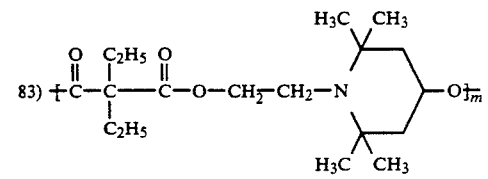
84) 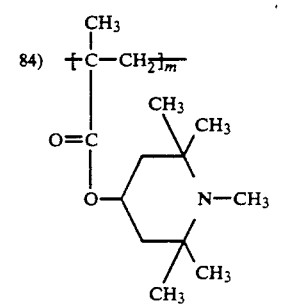

85) 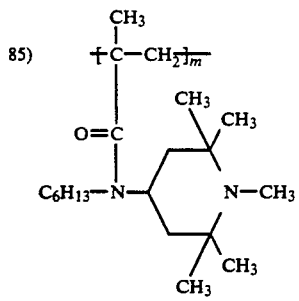

86) 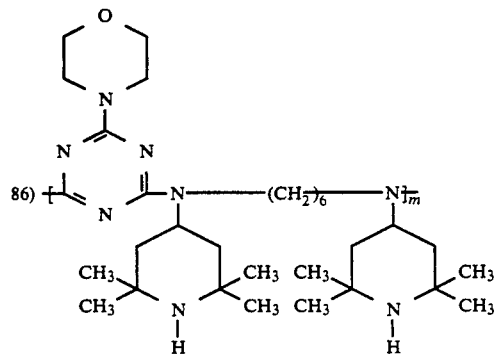

87) 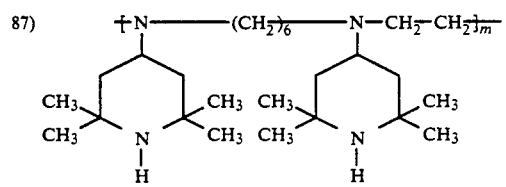

88) 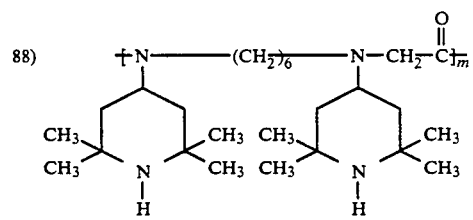

Of these classes of compounds, classes a), e) and f) are particularly suitable, preferably compounds 8, 11, 12, 15, 19, 20, 69, 71, 75, 78, 86 and 87.

Other known stabilisers may be added to the stabilised copolymers. Typical examples of such stabilisers are those of the following classes:

1. Antioxidants 1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol.

1.2. Alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol.

1.3. Hydroxylated thiodiphenyl ethers, for example 2,2'-thiobis(6-tert-butyl-4-methylphenol), 4,4'-thiobis(6-tert-butyl-2-methylphenol).

1.4. Alkylidenebisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tertbutyl-4-hydroxy-5-methylphenyl)dicyclopentadiene, bis[2-(3'-tert-butyl-2'-hydroxy-5'-methylbenzyl)-6-tert-butyl-4methylphenyl] terephthalate.

1.5. Benzyl compounds, for example 1,3,5-tris(3,5-di-tert-butyl-4-hydroxybenzyl)-2,4,6-trimethylbenzene, bis(3,5-di-tert-butyl-4-hydroxybenzyl) sulfide, isooctyl 3,5-di-tert-butyl-4-hydroxybenzylmercaptoacetate, bis(4-tert-butyl-3-hydroxy-2,6-dimethylbenzyl) dithiolterephthalate, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate, 1,3,5-tris-(3,5-dicyclohexyl-4-hydroxybenzyl)isocyanurate.

1.6. Acylaminophenols, for example 4-hydroxylauranilide, 4-hydroxystearanilide, 2,4-bis(octylmercapto)-6-(3,5-di-tert-butyl-4-hydroxyanilino)-s-triazine, octyl N-(3,5-di-tert-butyl-4-hydroxyphenyl)carbamate.

1.7. Esters of β-(3,5-di-tert-butyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.8. Esters of β-(5-tert-butyl-4-hydroxy-3-methylphenyl)propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.9. Esters of β-(3,5-dicyclohexyl-4-hydroxyphenyl)-propionic acid with mono- or polyhydric alcohols, e.g. with methanol, diethylene glycol, octadecanol, triethylene glycol, 1,6-hexanediol, pentaerythritol, neopentyl glycol, tris(hydroxyethyl) isocyanurate, thiodiethylene glycol, N,N'-bis(hydroxyethyl)oxalyl diamide.

1.10. Amides of β-(3,5-di-tert-butyl-4-hydroxyphenyl)propionic acid e.g. N,N'-bis(3,5-di-tert-butyl-4-hydroxyphenylpropionyl)hexamethylene-diamine, N,N'-bis(3,5-di-tert-butyl-4-hydroxyphenylpropionyl)-trimethylene-diamine, N,N'-bis(3,5-di-tert-butyl-4-hydroxyphenylpropionyl)hydrazine.

2. UV absorbers and light stabilisers 2.1. 2-(2'-Hydroxyphenyl)benzotriazoles, for example the 5'-methyl, 3',5'-di-tert-butyl, 5'-tert-butyl, 5'-(1,1,3,3-tetramethylbutyl), 5-chloro-3',5'-di-tert-butyl, 5-chloro-3'-tert-butyl-5=-methyl, 3'-sec-butyl-5'-tert-butyl, 4'-octoxy, 3',5'-di-tert-amyl and 3',5'-bis(α,α-dimethylbenzyl) derivative.

2.2. 2-Hydroxybenzophenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

2.3. Esters of substituted and unsubstituted benzoic acids, for example, 4-tert-butylphenyl salicylate, phenyl salicylate, octylphenyl salicylate, dibenzoylresorcinol, bis(4-tert-butylbenzoyl)-resorcinol, benzoylresorcinol, 2,4-di-tert-butylphenyl 3,5-di-tert-butyl-4-hydroxy-benzoate and hexadecyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxy-cinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of 4-hydroxy-3,5-di-tert-butylbenzyl-phosphonic acid monoalkyl esters, e.g. of the methyl or ethyl ester, nickel complexes of ketoximes, e.g. of 2-hydroxy-4-methyl-phenyl undecyl ketoneoxime, nickel complexes of 1-phenyl-4-lauroyl-5-hydroxypyrazole, with or without additional ligands.

2.6. Oxalyl diamides, for example 4,4'-dioctyloxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butoxanilide and mixtures of ortho- and para-methoxy-disubstituted oxanilides and mixtures of o-and p-ethoxydisubstituted oxanilides.

2.7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxy-phenyl)-4,6-bis(2,4-dimethylphenyl)-1,3,5-triazine, 2-(2,4-dihydroxy-phenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine.

3. Metal deactivators, for example N,N'-diphenyloxalyl diamide, N-salicylal-N'-salicyloylhydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalic dihydrazide.

4. Phosphites and phosphonites, for example triphenyl phosphite, diphenylalkyl phosphites, phenyldialkyl phosphites, tris(nonylphenyl) phosphite, trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tertbutylphenyl) pentaerythritol diphosphite, tristearyl sorbitol triphosphite, tetrakis-(2,4-di-tert-butylphenyl) 4,4'-biphenylene diphosphonite, 3,9-bis(2,4-di-tert-butylphenoxy)-2,4,8,10-tetraoxa-3,9-diphosphaspiro[5.5]undecane.

The concurrent use of phenolic antioxidants, UV absorbers and of phosphites or phosphonites is especially important. These additives are preferably incorporated in an amount of 0.05 to 5% by weight, based on the copolymer.

Further conventional modifiers used in plastics technology may also be added, typically pigments, fillers, reinforcing agents, lubricants, flame retardants, antistatic agents or blowing agents.

The invention is illustrated by the following non-limitative Examples in which, unless otherwise stated, parts and percentages are by weight.

EXAMPLE 1

1150 g of a polybutadiene latex with 59% solids content (BAYGAL ® 2004K, Bayer AG) and 1220 g of deionised water are charged to a 3 liter reactor, degassed 4 times, stirred under argon at 100 rpm and heated over 30 minutes to 60° C. Then 0.1 g of tert-dodecylmercaptan and 54 g of 4-acryloyloxy-1,2,2,6,6-pentamethylpiperidine (APP) are added. The stirring rate is increased for 2 minutes to c. 250 rpm, then reduced to 100 rpm and 2 g of potassium persulfate are added immediately. After polymerisation for 7 hours the latex is cooled to room temperature.

In a 3 liter stirred vessel, 680 g of this latex are diluted with 600 g of water. After degassing 4 times, the temperature is brought to 60° C. over half an hour. An aqueous solution of emulsifier is then added. It consists of 31 ml of a 10% solution of potassium rosinate (DRESINATE ® 731, Hercules Inc.), 2.7 ml of a 10% NaOH solution, 6.7 ml of a 10% glucose solution and 1.6 ml of a 10% solution of sodium alkylnaphthalenesulfonate (TAMOL ® NN, BASF AG). The initiator is prepared by dissolving 500 mg of $FeSO_4.7H_2O$ in 50 ml of water, adding 16 ml of this solution to 36 ml of water and to 4.8 g of $Na_4P_2O_7$ in 48 ml of water. After stirring for 15 minutes, this 100 ml degassed solution is added to the latex. Then 400 g of styrene, 200 g of acrylonitrile, 4.0 g of tert-dodecylmercaptan and 4.0 g of cumene hydroperoxide are added and the mixture is stirred for 7 hours at 60° C. at a stirring rate of 100 rpm. All these operations are carried out in the absence of oxygen.

To the latex are added 10 ml of a 20% aqueous emulsion of a phenolic antioxidant (IRGANOX ® 1076, Ciba-Geigy AG) and 100 ml of a 10% solution of the sodium salt of ethylenediaminetetraacetic acid, and the latex is filtered over glass wool.

With stirring (300 rpm), the emulsion is added rapidly to 4 liters of water of 90° C. and 70 ml of an aqueous solution of 10% $MgSO_4.7H_2O$ and 5% acetic acid and precipitated. The liquid phase above the precipitated copolymer has a pH of 5.3, which is adjusted to 8 by adding sodium carbonate solution. The coagulation is brought to completion by stirring for 30 minutes at 90° C. The copolymer, which has precipitated in powder form, is isolated hot by filtration, to give 740 g of a colourless powder which contains 2% of APP.

In similar manner, polymers into which different amounts of APP are incorporated are prepared in accordance with the particulars given in Table 1. The polymers are blended on a two-roll mill for 4 minutes at 170° C. with 1% of a lubricant (IRGAWAX ® 280, Ciba-Geigy AG), 0.5% of a UV absorber (TINUVIN ® P, Ciba-Geigy AG) and 1% of a hindered amine which is not unsaturated.

The amines used are:
HA-1=bis(1,2,2,6,6-pentamethyl-4-piperidyl)sebacate
HA-2=bis(2,2,6,6-tetramethyl-4-piperidyl)sebacate.

The mixtures are compression moulded in a hot press at 180° C. to 2 mm sheets. Test specimens measuring 10×60×2 mm are cut from these sheets and irradiated with UV light in a Xenotest 450. Samples are taken at regular intervals and assessed for their impact strength according to ASTM D 4508-85. The exposed side of the specimen is struck with the pendulum. The impact energy required to fracture the specimen is indicated in Table 1. The higher this value, the greater the impact strength of the specimen. Undamaged specimens exhibit no fracture (NF).

TABLE 1

| Concentration of grafted APP* | Concentration of amine light stabiliser added | Impact strength in kJ/m² after | | | hours in the Xenotest 450 |
|---|---|---|---|---|---|
| | | 240 | 320 | 450 | |
| 1.5% | 0% HA-1 | 43 | 35 | 33 | |

TABLE 1-continued

| Concentration of grafted APP* | Concentration of amine light stabiliser added | Impact strength in kJ/m² after | | | hours in the Xenotest 450 |
|---|---|---|---|---|---|
| | | 240 | 320 | 450 | |
| 1.5% | 1% HA-1 | NF | 61 | 58 | |
| 0.8% | 0% HA-1 | 47 | 45 | 31 | |
| 0.8% | 1% HA-1 | 49 | 46 | 34 | |
| 0% | 0% HA-1 | 29 | 19 | 18 | |
| 0% | 1% HA-1 | 43 | 32 | 29 | |
| 1.5% | 1% HA-2 | NF | NF | 51 | |

*calculated from the N content

EXAMPLE 2

The copolymer (ABS polymer) is prepared as in Example 1 and, as described therein, blended on a two-roll mill with lubricant, UV absorber and sterically hindered amine. In addition, 0.5% of tris(nonylphenyl)-phosphite (TNPP) is added as processing stabiliser.

The effectiveness of the additives is tested as in Example 1 by determining the impact strength after exposure to UV radiation. The results are reported in Table 2.

TABLE 2

| Concentration of grafted APP | Concentration of TNPP | Light Stabiliser added | Impact strength in kJ/m² after | | | hours in the Xenotest 450 |
|---|---|---|---|---|---|---|
| | | | 240 | 450 | 950 | |
| 1.5% | 0% | 1% HA-2 | NF | 51 | 26 | |
| 1.5% | 0.5% | 1% HA-2 | NF | NF | 33 | |

EXAMPLE 3

Example 1 is repeated using polymers containing different amounts of grafted APP and of light stabilisers in accordance with the particulars of Table 3.

TABLE 3

| Concentration of grafted APP | Concentration of light stabiliser added | Impact strength in kJ/m² after | | hours in the Xenotest 450 |
|---|---|---|---|---|
| | | 500 | 1550 | |
| 2.0% | 1% HA-1 | NF | 31 | |
| 0% | 2% APP 1% HA-1 | NF | 19 | |
| 0% | 3% HA-1 | NF | 25 | |

(antioxidant: 0.2% of IRGANOX ® 1076; processing stabiliser: 0.5% of TNPP)

EXAMPLE 4

Example 1 is repeated using polymers containing different amounts of grafted APP and of light stabilisers in accordance with the particulars of Table 4.

TABLE 4

| Concentration of grafted APP | Concentration of light stabiliser added | Impact strength in kJ/m² after | | | hours in the Xenotest 450 |
|---|---|---|---|---|---|
| | | 250 | 500 | 1080 | |
| 2.0% | 0% | NF | NF | 23 | |
| 2.0% | 1% HA-1 | NF | NF | 33 | |
| 0% | 0% | NF | 24 | 20 | |
| 0% | 1% HA-1 | NF | NF | 13 | |
| 0% | 2% APP 1% HA-1 | NF | NF | 14 | |

(antioxidant: 0.2% of IRGANOX ® 1076; processing stabiliser: 0.5% of IRGAFOS ® 168)

EXAMPLE 5

The copolymer is prepared as in Example 1, except that copolymerisation is carried out with 2% of butyl acrylate together with the APP. Compounding is effected as described in Example 1 by incorporating the following additives:

| lubricant | 1% of IRGAWAX ® 280 |
| --- | --- |
| UV absorber | 0.5% of TINUVIN ® P |
| processing stabiliser | 0.5% of TNPP |
| amine light stabiliser | 0.5% or 1% of HA-1 or HA-2 |

The effectiveness of the additives is tested as in Example 1.

The results are reported in Table 5.

TABLE 5

| Concentration of grafted APP | Amine light stabiliser added | Impact strength in kJ/m² after | | |
| --- | --- | --- | --- | --- |
| | | 150 | 200 | 380 hours in the Xenotest 450 |
| 1.5% | 0% | 48 | 30 | 22 |
| 1.5% | 0.5% HA-1 | NF | 48 | 29 |
| 1.5% | 1% HA-1 | NF | 55 | 46 |
| 1.5% | 1% HA-2 | NF | NF | NF |

EXAMPLE 6

The copolymer is prepared as in Example 1, except that 4-methacryloyloxy-1,2,2,6,6-pentamethylpiperidine (MAPP) is used as HALS. Compounding is effected as in Example 1 by incorporating the following additives:

| lubricant | 1% of IRGANOX ® 280 |
| --- | --- |
| UV absorber | 0.5% of TINUVIN ® P |
| processing stabiliser | 0.5% of TNPP |
| amine light stabiliser | 1% of HA-1 or HA-2 |

The effectiveness of the additives is tested as in Example 1.

The results are reported in Table 6.

TABLE 6

| Concentration of grafted MAPP | Concentration of light stabiliser added | Impact strength in kJ/m² after | | |
| --- | --- | --- | --- | --- |
| | | 250 | 500 | 770 hours in the Xenotest 450 |
| 2.0% | 0% | NF | 26 | 22 |
| 2.0% | 1% HA-1 | NF | NF | 28 |
| 2.0% | 1% HA-2 | NF | NF | 27 |

What is claimed is:

1. A process for the preparation of a stabilised copolymer of styrene or α-methylstyrene and at least one ethylenically unsaturated comonomer, which copolymer contains crosslinked elastomer particles which are modified by copolymerization with an unsaturated derivative of a sterically hindered amine of formula I or formula II

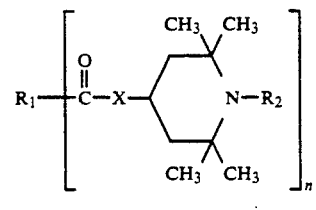

wherein
n is 1 or 2 and X is —O— or —N(R₃)—,
R₁, when n=1, is $C_{1'}-C_{18}$alkyl, $C_{2'}-C_{20}$alkenyl, $C_5-C_8$cycloalkyl, $C_7-C_9$phenylalkyl, phenyl, phenyl which is substituted by halogen, $C_1-C_4$alkyl or $C_1-C_4$alkoxy, or is a $R_4OOC-CH=CH-$ group and,
R₁, when n=2, is $C_2-C_{10}$alkylene, vinylene, $C_6-C_{12}$arylene or cyclohexylene,
R₂, is hydrogen, O., $C_1-C_{12}$alkyl, $C_3-C_5$alkenyl, $C_7-C_9$phenylalkyl, $C_1-C_{18}$alkoxy, $C_5-C_8$cycloalkoxy, $C_7-C_9$phenylalkoxy, $C_2-C_{10}$alkanoyl, $C_3-C_6$alkenoyl or a group of formula Ia

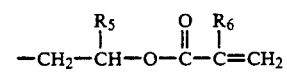

R₃ is hydrogen, $C_{1'}-C_{12}$alkyl or $C_5-C_8$cycloalkyl,
R₄ is hydrogen or $C_1-C_{12}$alkyl,
R₅ is hydrogen, CH₃ or CN, and
R₆ is hydrogen, $C_1-C_{12}$alkyl or phenyl,
with the proviso that at least one of the substituents R₁ and R₂ contains an ethylenic double bond; or

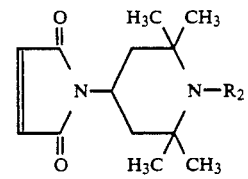

wherein R₂ is hydrogen, $C_1-C_{12}$alkyl, $C_3-C_5$alkenyl, $C_7-C_9$phenylalkyl, $C_1-C_{18}$alkoxy, $C_5-C_8$cycloalkoxy, $C_7-C_9$phenylalkoxy or $C_2-C_{10}$alkanoyl;
which process comprises
first grafting an unsaturated sterically hindered amine of formula I or formula II onto the elastomer particles,
then grafting a mixture of styrene or α-methylstyrene and at least one ethylenically unsaturated comonomer onto the so modified elastomer particles, and
finally, adding to the resultant copolymer a sterically hindered amine which is not unsaturated and which is a derivative of 2,2,6,6-tetramethylpiperidine, having formula IV

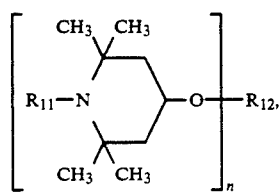

wherein n is an integer from 1 to 4, $R_{11}$ is H, $C_1$-$C_4$alkyl, benzyl, acetyl, $C_1$-$C_{12}$alkoxy, $C_7$-$C_9$phenylalkoxy or cyclohexyloxy, and $R_{12}$, when n is 1, is the radical of a saturated aliphatic carboxylic acid of 2 to 18 carbon atoms, of a saturated cycloaliphatic carboxylic acid of 7 to 15 carbon atoms, or of an aromatic carboxylic acid of 7 to 15 carbon atoms, $R_{12}$, when n is 2, is the divalent radical of a saturated aliphatic dicarboxylic acid of 2 to 12 carbon atoms, of a saturated cycloaliphatic or aromatic dicarboxylic acid of 8 to 14 carbon atoms, or of a saturated aliphatic, cycloaliphatic or aromatic dicarbamic acid of 8 to 14 carbon atoms, $R_{12}$, when n is 3, is the trivalent radical of a saturated aliphatic tricarboxylic acid of 6 to 12 carbon atoms or of an aromatic tricarboxylic acid of 9 to 15 carbon atoms, and, $R_{12}$, when n is 4, is the tetravalent radical of a saturated aliphatic tetracarboxylic acid of 8 to 12 carbon atoms or of an aromatic tetracarboxylic acid of 10 to 16 carbon atoms.

2. A process according to claim 1, which comprises carrying out the grafting of the sterically hindered amine and the mixture of styrene or α-methylstyrene and at least one comonomer in aqueous emulsion, precipitating the copolymer so obtained by coagulation, and adding the sterically hindered amine which is not unsaturated to the coagulated copolymer.

3. A process according to claim 1, which comprises grafting a comonomer of the class of the alkyl acrylates or alkyl methacrylates, together with the unsaturated hindered amine, onto the elastomer.

* * * * *